United States Patent [19]

Mo

[11] Patent Number: 6,084,689
[45] Date of Patent: Jul. 4, 2000

[54] METHOD AND APPARATUS FOR SATURATION COMPENSATION IN TOTAL INK LIMITED OUTPUT

[75] Inventor: Gan Mo, Marletta, Ga.

[73] Assignee: Colorbus, Inc., Irvine, Calif.

[21] Appl. No.: 09/038,757

[22] Filed: Mar. 11, 1998

[51] Int. Cl.[7] ............................... H04N 1/50; H04N 1/60
[52] U.S. Cl. ........................... 358/1.9; 358/518; 358/529
[58] Field of Search ............................. 395/109; 382/162, 382/167; 358/518, 520, 521, 529, 530

[56] References Cited

U.S. PATENT DOCUMENTS

| | | | |
|---|---|---|---|
| 4,792,847 | 12/1988 | Shimazaki et al. ...................... | 358/521 |
| 5,359,437 | 10/1994 | Hibi ........................................ | 358/529 |
| 5,386,305 | 1/1995 | Usami ..................................... | 358/518 |
| 5,459,590 | 10/1995 | Bleker et al. ............................ | 358/518 |
| 5,502,579 | 3/1996 | Kita et al. ................................ | 358/518 |

*Primary Examiner*—Scott Rogers
*Attorney, Agent, or Firm*—The Hecker Law Group

[57] ABSTRACT

The invention is directed to providing a saturation compensation technique for color printing that compensates for the over or under reduction of colorant levels that can result from gray component replacement (GCR) or under color removal (UCR) techniques. To solve the problems associated with the prior art GCR/UCR systems, embodiments of the invention implement a saturation compensation technique such that an overreduction of colorant levels is compensated for by increasing the color components (e.g., C, M and Y color components) of a color model accordingly. The saturation level that has been reduced to below a threshold TAC value can be increased to define richer looking, denser images. Embodiments of the invention determine the amount of the increase that is used to achieve a level of saturation that does not exceed the threshold TAC value. Alternatively, if there is an insufficient reduction of colorant levels such that the combined colorant levels (e.g., the sum of the values of the C, M, Y and K color components in a CMYK color model) are greater than a threshold TAC value, embodiments of the invention decrease the saturation level by scaling down component values (e.g., the C, M and Y components) by a factor, X.

17 Claims, 6 Drawing Sheets

METHOD AND APPARATUS FOR SATURATION COMPENSATION IN TOTAL INK LIMITED OUTPUT

BACKGROUND OF THE INVENTION

1. Field of the Invention

This invention relates to the generation of color graphic output, and more specifically to the determination of the amount of colorant used to express a color in a given area of a color graphic image.

2. Background Art

Color printers used with computer systems can reproduce thousands of shades of color by using different combinations of inks. The ink colors typically are cyan, magenta, yellow and black. A problem with current color printers is the inability of the printer paper to absorb all of the ink that could be printed on the paper. This limits the number of different colors that can be printed. This problem is understood by the following background information on color printing.

To generate a color image on a color printer, a color output device such as a computer typically transfers or applies a number of colorants (e.g., cyan, magenta, yellow and black ink or toner) to an output media (e.g., paper). The color that is reproduced on the output media is dependent on the percentage of each colorant applied to the output media. The amount of a colorant can be expressed as a percentage. For example, a color can be expressed as a percentage of cyan, magenta, yellow and black (CMYK) colorants. The total amount of colorant applied to a given region of an output medium is the combined amounts of CMYK.

It may be necessary to limit the total amount of colorant applied to an output media. The output media may not be capable of absorbing the total amount of colorant (i.e., the combined amounts of CMYK), for example. This minimizes the possibility that the colorants will bleed, run or smear, for example. Further, by reducing the amount of expensive color ink/toner, the cost of the output can be reduced. Thus, it is beneficial to limit the total amount of colorant used to output a color image.

A total area coverage (TAC) amount represents a measure of the total amount of ink (or colorant) that is to be applied to a given area of the output media. TAC is typically expressed as a percentage. For example, if 100% of each of the CMYK colorants are applied to the same area, the TAC is 400%. Similarly, if 50% of each of the four colorants are applied to the same area, the TAC is 200%. It may be necessary to specify a TAC amount, for example, to ensure that the ink can be absorbed by the output media, or to reduce the cost of generating the output.

One technique that has been used to limit the total amount of colorant is Gray Component Replacement (GCR). GCR replaces a gray component of a color with an equal amount of black color. The gray component is comprised of a mixture of C, M and Y colors. Thus, it takes a combination of three colors to produce the gray component of a color. The mixture of the C, M and Y colors used to generate the gray component produces a muddy brown color. GCR replaces the muddy brown color produced by the CMY mixture with black. Thus, only one color (i.e., black) is used to generate the gray component instead of the three C, M and Y colorants. The overall ink used to generate the color is, therefore, reduced.

Another technique used to limit the amount of ink used to generate a color is Undercolor Removal (UCR). UCR replaces equal proportions of CMY with K in the shadow tones of an image. Since the three CMY colorants are replaced with the one K colorant, the total amount of colorant applied to an area is reduced.

Both the GCR and UCR techniques produce a total amount of colorant, a GCR/UCR total, that is to be applied to a given area in which the amount of CMY is decreased and K is increased by some amount. The color produced by a CMY colorant combination has a denser or richer appearance than a color produced by the K colorant. Thus, the substitution of K for CMY in the GCR/UCR schemes can result in a duller, diluted looking image.

The GCR and UCR techniques attempt to limit the colorants used by applying a single colorant amount in place of three colorant amounts. However, even with this substitution, the GCR and UCR techniques do not ensure that the resulting GCR/UCR total has been sufficiently reduced such that the remaining colorant levels satisfy an allowable TAC amount.

Thus, current GCR/UCR techniques can overly reduce the saturation levels of color images and/or fail to ensure that a resulting GCR/UCR colorant satisfies a combined colorant level (e.g., a threshold TAC amount). For example, current GCR/UCR techniques can result in an overreduction in the colorant levels. That is, the reduction in one or more of the colorants used to generate a color as determined by a GCR/UCR technique can be greater than needed to achieve a desired goal (e.g., to ensure that the combined colorants can be absorbed by the printer paper). An overreduction caused by a GCR/UCR technique can result in a diluted image. Alternatively, current GCR/UCR techniques can cause an underreduction in the colorant levels. That is, despite the reductions performed by the current GCR/UCR techniques, the combined colorant level is greater than that allowed to ensure that the inks can be absorbed by the paper.

Background References

The following U.S. patents pertain to color image processing:

U.S. Pat. No. 4,831,409 to Tatara et al. discloses a color image processing system having a UCR function. Tatara et al. sequentially print three color component images (C, M, Y), followed by a black component image (K) so that only a single frame memory is required. Tatara et al. provide switchable operation of the UCR function.

U.S. Pat. No. 5,018,085 to Smith, Jr. teaches a system for receiving R, G, and B data in digital form, such as produced by an artist using a "paint" program on a monitor screen, and converting such data to CMYB data for printing. The system independently determines tone correction values for gray balance control and color values. The system further provides for calibration procedures.

U.S. Pat. No. 5,077,604 to Kivolowitz et al. provides a system for converting from an RGB color space to a CMYK color space and adding black ink to a resulting color such that the application of black ink is more toward colors of neutral tone and less toward saturated colors. Kivolowitz calculates a saturation value, S, for a color defined by R, G, and B values using the formula $$S = \frac{\max(RGB) - \min(RGB)}{\max(RGB)}.$$

A percent color removal (PCR) function of the form $m(1-S^{1/4})$ is used to determine the amount to be removed from the R, G, and B color values. The R, G and B values are inverted (i.e., subtracted from 1) to convert them to C, M and Y values. The amount of black that is added back is determined by multiplying the result of the PCR function by the average of the C, M and Y values.

U.S. Pat. No. 5,087,126 to Pochieh (Hung) '126 teaches a method of estimating colors for color image correction. The method is suitable for the formation of a look-up table (LUT) in a color correcting apparatus of a video printer or a digital color copying machine. According to the method, when a specific area in which a target value T' of a given colorimetric system is present is obtained, a combination of fundamental colors T corresponding to the target value T' is calculated. The combination of fundamental colors T is calculated based on the values of the colorimetric system surrounding the target value T' and a combination of fundamental colors corresponding to the values of the colorimetric system.

U.S. Pat. No. 5,339,176 to Smilansky et al. discloses a technique for calibrating a color processing device without reference to human aesthetic judgment and a technique for transforming an element of a domain of a first color printing device to an element of a domain of a second color printing device. Smilansky et al. do not teach the use of their calibration technique with UCR or GCR processes, but only to incorporate a new digital electronic color separation scanner into an existing reproduction system using automatic calibration to achieve emulation of a UCR, GCR, or UCA (under color addition) reproduction produced by the existing system.

U.S. Pat. No. 5,355,440 to Sayanagi et al. provide a method for deciding the area ratios $A_y$, $A_M$, $A_C$, and $A_K$ of Y, M, C, and K inks, which reproduce a target color X, Y, Z. The method is based upon biquadratic Neugebauer equations with four unknowns using tristimulus values of 16 types of color points obtained from actual measurement of the Y, M, C, and K inks employed in actual printing.

U.S. Pat. No. 5,363,318 to McCauley provides a system for creating channel independent linear transfer functions or calibration curves for color devices such as printers, scanners, and displays. Color saturation effects are removed by scaling or normalizing to some maximum input drive level that does not saturate any of the colors.

U.S. Pat. No. 5,381,349 to Winter et al. teach a system for calibration of color in a computer display that enables recovery from user errors. A color display screen displays a calibration color patch and a comparison color patch. The user adjusts the color of the comparison color patch until a color match is perceived. The system then determine a transfer function to convert from the value that generated the comparison color to the value assigned to the calibration color. The system can also be used to compare two transfer functions to determine if they are within a transfer function threshold value of each other.

U.S. Pat. No. 5,402,245 to Motta et al. disclose a bi-level digital color printer system with improved UCR and error diffusion processes. Motta describes a UCR technique for making a color more vivid by reducing the gray component in the color. Motta determines the color's gray component (GC). A small amount (e.g., 5% of GC) is removed from GC to yield GC'. Motta then determines what, if any, portion of GC' is removed from the color and converted to black. Motta categorizes GC' as being within either a light, medium or dark gray scale range. If GC' is within a light gray scale range, the net effect in Motta is to keep GC' in C, M and Y. If GC' is within the dark gray scale range, the net effect is to remove GC' from C, M, and Y and add it back as black. If the color is within the medium gray scale range, an exponential function is used to determine the portion of GC' that is removed from C, M and Y and added back as black.

U.S. Pat. No. 5,402,253 to Seki provides a color conversion apparatus with a variable GCR ratio. The color conversion apparatus determines a reflectance p(k') of an achromatic colorant from an amount k' of the achromatic colorant, then determines chromaticity values L*, H*, and C* according to the following equations:

$$L^* = p(k')^{-\frac{1}{2}}(L^*_0 + 16) - 16$$

$$H^* = H^*_0$$

where $L^*_0$, $H^*_0$, and $C^*_0$ denote chromaticity $$C^* = p(k')^{-\frac{1}{2}} C^*_0$$

values of the input color signals.

U.S. Pat. No. 5,459,590 to Bleker et al. disclose a method for freely selectable substitution of the achromatic part in multi-color printing with the black ink. A two-dimensional, non-linear deepening field is formed with luminance values and a two-dimensional, non-linear desaturation field is formed with saturation values taken from the original. The substitution of the achromatic part with black ink is undertaken by an iterative search within the deepening field and within the desaturation field.

U.S. Pat. No. 5,508,827 to Po-Chieh (Hung) teaches a color separation processing method and apparatus for gradually changing a black color component from the black color component of neighbor portions of a color image. A combination of Y, M, C, and K is first calculated from a color solid which is made under the condition of Y=0, M=0, C=0, and K=max. This yields a $K_{max}$ value. Then, a combination of Y, M, C, and K is calculated from a color solid which is made under the condition of Y=max, M=max, C=max, and K=0. This yields a $K_{min}$ value. A $K_{new}$ value is calculated as $(1-\alpha) \bullet K_{min} + \alpha \bullet K_{max}$. The $K_{new}$ value is used to determine the combination of the three colors (Y, M, C) to be used to reproduce the target color.

U.S. Pat. No. 5,553,199 to Spaulding et al. disclose a method for calibrating a four color printer capable of printing three colors and black. The method includes the steps of forming a minimum black data structure representing a minimum black strategy; forming a maximum black data structure representing a maximum black strategy; for each printable black level, forming a fixed black data structure. The method also includes the step, for a specific output color value, of finding the minimum and maximum black levels using the minimum and maximum black data structures. The method further includes the steps of determining a desired black level between the minimum and maximum black levels according to a defined black strategy, and determining the three printing color levels from the fixed black data structure corresponding to the desired black level.

U.S. Pat. No. 5,572,632 to Laumeyer et al. provide a method for image data processing using a transformation to device independent, intermediate color space color coordinates and storing such coordinates in an intermediate frame buffer. The method involves converting input color coordinates to L*, a*, and b* color coordinates for each output image pixel, storing the L*, a*, and b* color coordinates in a frame buffer, converting the frame buffer data from L*, a*, and b* color coordinates to C, M, Y, and K color coordinates. The method further involves converting the C, M, Y, and K color coordinates to dot gain corrected color coordinate data and storing the dot gain corrected data in a printer C, M, Y, and K frame buffer.

U.S. Pat. No. 5,615,312 to Kohler discloses a business graphics rendering mode that provides increased color contrast for business graphics applications, while leaving essentially unaltered achromatic neutrally-colored areas of the image. By not altering achromatic neutrally-colored areas, Kohler avoids undesirably converting light gray areas to white and dark gray areas to black.

SUMMARY OF THE INVENTION

The invention is directed to providing a saturation compensation technique for color printing that compensates for the over or under reduction of colorant levels that can result from prior art gray component replacement (GCR) or under color removal (UCR) techniques.

To solve the problems associated with the prior art GCR/UCR systems, embodiments of the invention implement a saturation compensation technique such that an overreduction of colorant levels is compensated for by increasing the color components (e.g., C, M and Y color components) of a color model accordingly. The saturation level that has been reduced to below a threshold TAC value can be increased to define richer looking, denser images. Embodiments of the invention determine the amount of the increase that is used to achieve a level of saturation that does not exceed the threshold TAC value.

Alternatively, if there is an insufficient reduction of colorant levels such that the combined colorant levels (e.g., the sum of the values of the C, M, Y and K color components in a CMYK color model) are greater than a threshold TAC value, embodiments of the invention decrease the saturation level by scaling down component values (e.g., the C, M and Y components) by a factor, X.

DETAILED DESCRIPTION OF THE INVENTION

A method and apparatus for saturation compensation in total ink limited output is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Hardware Embodiment of a General Purpose Computer System

Figure 1:
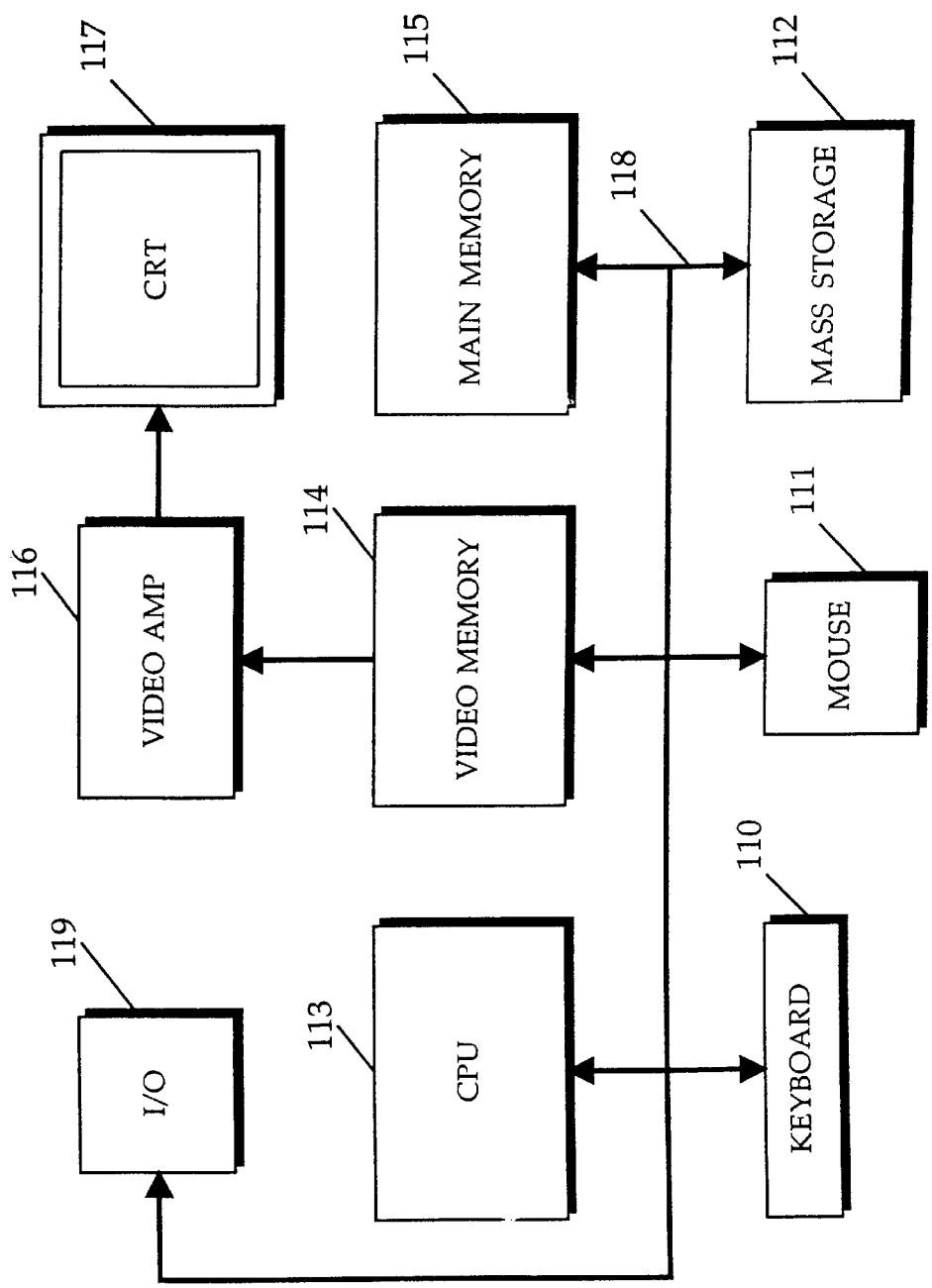
FIG. 1 is a block diagram of a general purpose computer suitable for implementing embodiments of the invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola™, such as the 680X0 or Power PC™ processor or a microprocessor manufactured by Intel™, such as the 80X86, or Pentium™ processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment.

Graphic Image

A color graphic image can be defined as a set of dots or pixels. Each pixel has a set of attributes associated with it. For example, pixel attributes include the percentages of color components (e.g., Cyan, Magenta, Yellow and Black) that comprise a color in a particular color model (e.g., CMYK color model) and the location of the dot in the color graphic image. The attributes can be used by computer rendering software applications to generate the color image.

Figure 2:
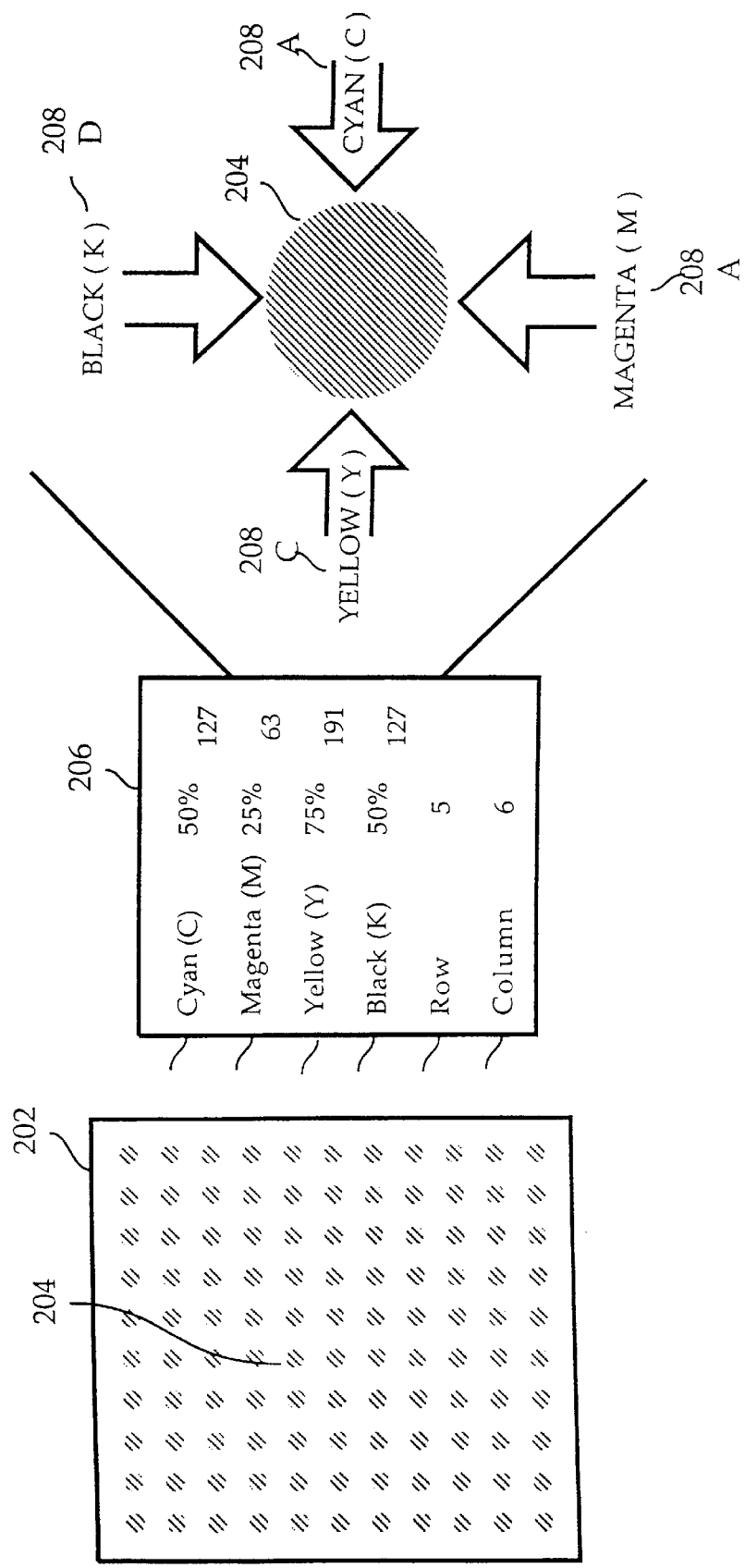
FIG. 2 illustrates a region of a color graphic image and an internal representation, or pixel, that defines attributes for a dot in the color graphic image.

FIG. 2 illustrates a region of a color graphic image and an internal representation, or pixel, that defines attributes for a dot in the color graphic image. Region 202 represents all or a portion of a color graphic image output generated by a computer system that consists of multiple rows and columns of dots. Dot 204 is included in region 202. In a computer system, dot 204 is typically represented within the computer system as a picture element, or pixel, that has a set of associated attributes. The attributes associated with pixel 206 can be used by a computer system to generate dot 204.

Positional attributes 216A–216B identify the row and column positions of dot 204 in region 202. If, for example, the upper left corner of region 202 is at row one and column 1, dot 204 lies at row five and column six of region 202.

Color attributes 218A–218D represent the contribution of the color components that define the color for dot 204. If the computer system is using a CMYK color model, color attributes 218A–218D specify the percentage of each of the cyan (C), magenta (M), yellow (Y) and black (K) color components that can comprise a color in the CMYK color model, for example. Color attributes 218A–218D can be specified as percentages that represent the percentage of each ink that is to be used to create the color for dot 204. For example, color attributes 218A–218D can specify 50% of the total amount of C, 25% of M, 75% Y and 50% of K should be used to generate dot 204.

The percentages specified for color attributes 218A–218D can also be defined as a number. For example, if 8 bits are used to define a color component's value, there can be $2^8$ or 256 values. The value is typically expressed as a range from 0 to 255. FIG. 2 illustrates possible values for C, M, Y and K using an 8-bit value range between 0 and 256, inclusive. For example, the 50% values for cyan and black are expressed as 127. The 25% and 75% values for magenta and yellow are expressed as 63 and 191, respectively.

To generate dot 204, color attributes 218A–218D are translated into an amount of colorant (e.g., a color ink or toner). For example, color attributes 218A–218D specify the levels of colorants 208A–208D that are used to generate dot 204. For example, colorants 208A–208D can be color ink or toner, if dot 204 is to be output by a color printer or copier.

GCR/UCR Schemes

Gray Component Replacement/Undercolor Removal (GCR/UCR) schemes are designed to replace the gray component of a color with black. In a CMYK color model, a color is defined by cyan (C), magenta (M), yellow (Y) and black (K) color components. The gray component of a color in the CMYK color model is formed from equal amounts of C, M and Y color components. One technique for determining the gray component in a CMYK color model is to determine the CMY color component that has the least value, since each of the CMY color components has that value in common. For example, if a color in the CMYK color model is comprised of 50% of C, 35% of M and 25% of Y, the gray component is the lesser of the three, or 25%. Each of C, M and Y contribute 25% to the color's gray component.

There are many variations to the GCR/UCR schemes each of which use a technique for determining the portion of the gray component that is to be replaced by black. In the CMYK color model, an amount is subtracted from the C, M, and Y components which is added to the black component. In the above example, 25% of C, M and Y is removed and 25% is added to the K component. If the K component had a value of 50%, the resulting values are 25%, 10%, 0%, and 75% for the C, M, Y and K color components, respectively.

The result of the GCR/UCR schemes is a total amount of colorant (i.e., totals for the C, M, Y and K color components) which is referred to as a GCR/UCR total. The current GCR/UCR techniques can overly reduce the saturation levels of color images and/or fail to ensure that a resulting GCR/UCR total satisfies a combined colorant level (e.g., a threshold TAC amount).

In some cases, the GCR/UCR total may unnecessarily dilute images by overly reducing color components C, M, and Y, and therefore overly reducing the saturation (density) level of color images. In other cases, the GCR/UCR total may provide insufficient color component reduction such that the GCR/UCR total is greater than an allowed total area coverage (TAC) threshold amount. TAC is a measure of the total amount of ink applied to an area (e.g., dot 204) of the output medium. A threshold TAC amount can be used to limit the amount of ink used to, for example, reduce cost or to ensure that the total amount of ink applied does not exceed the amount that can be absorbed by the output medium.

Figure 3:
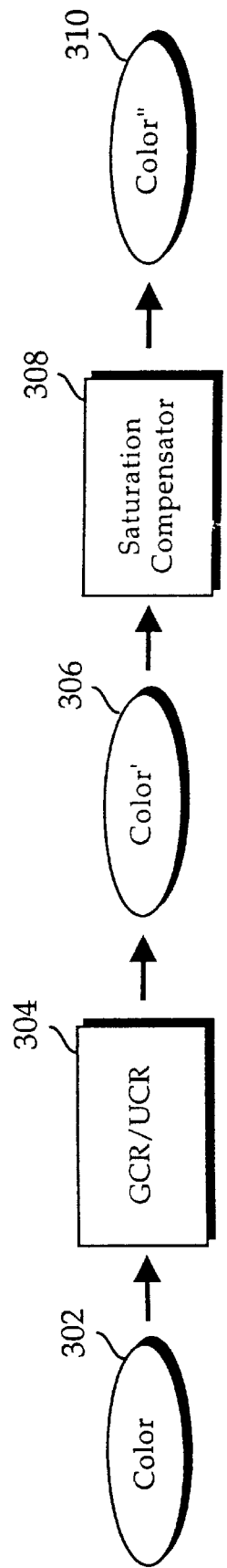
FIG. 3 provides a block diagram of an embodiment of the invention that performs saturation compensation.

Embodiments of the invention are used to examine the GCR/UCR total and compensate for excessive reduction or insufficient reduction of the color component values of a color. FIG. 3 provides a block diagram of an embodiment of the invention that performs saturation compensation.

Color 302 is defined by the mixture of color components that define a color in a particular color model. For example, color 302 can be comprised of some amount of C, M, Y and/or K in the CMYK color model. Color 302 is input to GCR/UCR 304 which can be any GCR/UCR technique including one of those described in the background section above.

GCR/UCR produces color' 306 which may include modifications to color 302. Color 302 and color' 306 identify a value for each color component. For example, in the CMYK color model, Color 302 and color' 306 specify a value for C, M, Y and K that can range from 0% to 100%. GCR/UCR 304 determines a gray component that is some combination of the C, M and Y components. To generate color' 306 from color 302, the gray component is removed (e.g., from the C, M, and Y components) and added back as black (e.g., added to the K component). Color' 306 includes modified C, M, Y and K values that are reduced to eliminate some amount of the gray generated and K is increased to yield a higher concentration of black, for example. Each of the values of the color components in color' 306 generated by GCR/UCR 304 cannot exceed 100% saturation.

However, GCR/UCR 304 does not ensure that the combination of the color components of color' 306 does not exceed a threshold TAC amount. Further, GCR/UCR 304 does not compensate for excessive reduction of the color component values of color' 306. That is, GCR/UCR 304 does not optimize the density of the resulting color by increasing levels of C, M and Y of color' 306 to add back an amount of C, M and Y where possible, or ensure that the combination of color components does not exceed a TAC threshold amount.

GCR/UCR 304 can reduce the C, M and Y components such that the resulting image can appear diluted. For example, if the C, M and Y components of color 302 are at a 30% level and K is at a 60% level, GCR/UCR 304 can remove all of C, M and Y and increase K to 90% to yield color' 306. However, a color comprised of only a K component appears thinner, or less dense, than a color that includes C, M and Y. Saturation compensator 308 can add back some amount of the C, M and Y values to color' 306 to create color" 310 that has a richer appearance. Saturation compensator 308 ensures that any modifications made to the C, M, Y and K values do not exceed a threshold TAC amount.

Color' 306 generated by GCR/UCR 304 can exceed the threshold TAC amount. In this case, saturation compensator 308 modifies color' 306 to generate color" 310 whose color component values do not exceed the TAC threshold amount. For example, color 302 can be comprised of 10% of C, 90% of M, 90% of Y and 90% of K. If GCR/UCR 304 reduces C, M and Y by 10% and increases K by 10%, color' 306 is comprised of 0% of C, 80% of M, 80% of Y and 100% of K. The TAC amount is the combination of the values of C, M, Y and K components, or 260%. Assuming a threshold TAC amount is 250%, color' 306 exceeds this amount. Saturation compensator 308 reduces color' 306 to yield color" 310 that does not exceed the threshold TAC amount.

Thus, saturation compensator 308 examines color' 306 to determine what, if any, modifications to make to color' 306 to yield color" 310. In some cases, saturation compensator 308 may increase the values of the color components to generate color" 310. In other cases, saturation compensator 308 may reduce the color component values to generate color" 310. In still other cases, saturation compensator 308 may not make any modification(s) to color' 306 to yield color" 310.

In FIG. 3, saturation compensator 308 and GCR/UCR 304 appear to operate serially. That is, the output of GCR/UCR 304 is operated on by saturation compensator 308. However, it should be apparent that saturation compensator 308 and GCR/UCR 304 can be integrated to generate color" 310 from color 302.

Embodiment of a Saturation Compensation Process Flow

To solve the problems associated with the prior art GCR/UCR systems, embodiments of the invention implement a saturation compensation technique such that an overreduction of colorant levels is compensated for by increasing the color components (e.g., C, M and Y color components) of a color model accordingly. The saturation level that has been reduced to below a threshold TAC value can be increased to recover and print richer looking, denser images. Embodiments of the invention determine the amount of the increase that is used to achieve a level of saturation that does not exceed the threshold TAC value.

Alternatively, if there is an insufficient reduction of colorant levels such that the combined colorant levels (e.g., the sum of the values of the C, M, Y and K color components in a CMYK color model) are greater than a threshold TAC value, embodiments of the invention decrease the saturation level by scaling down component values (e.g., the C, M and Y components) by a factor, X.

While it should be apparent that any threshold TAC value can be used with embodiments of the invention, a threshold TAC value between 200% and 400% has been found to preserve the hue of the original color.

Figure 4A:
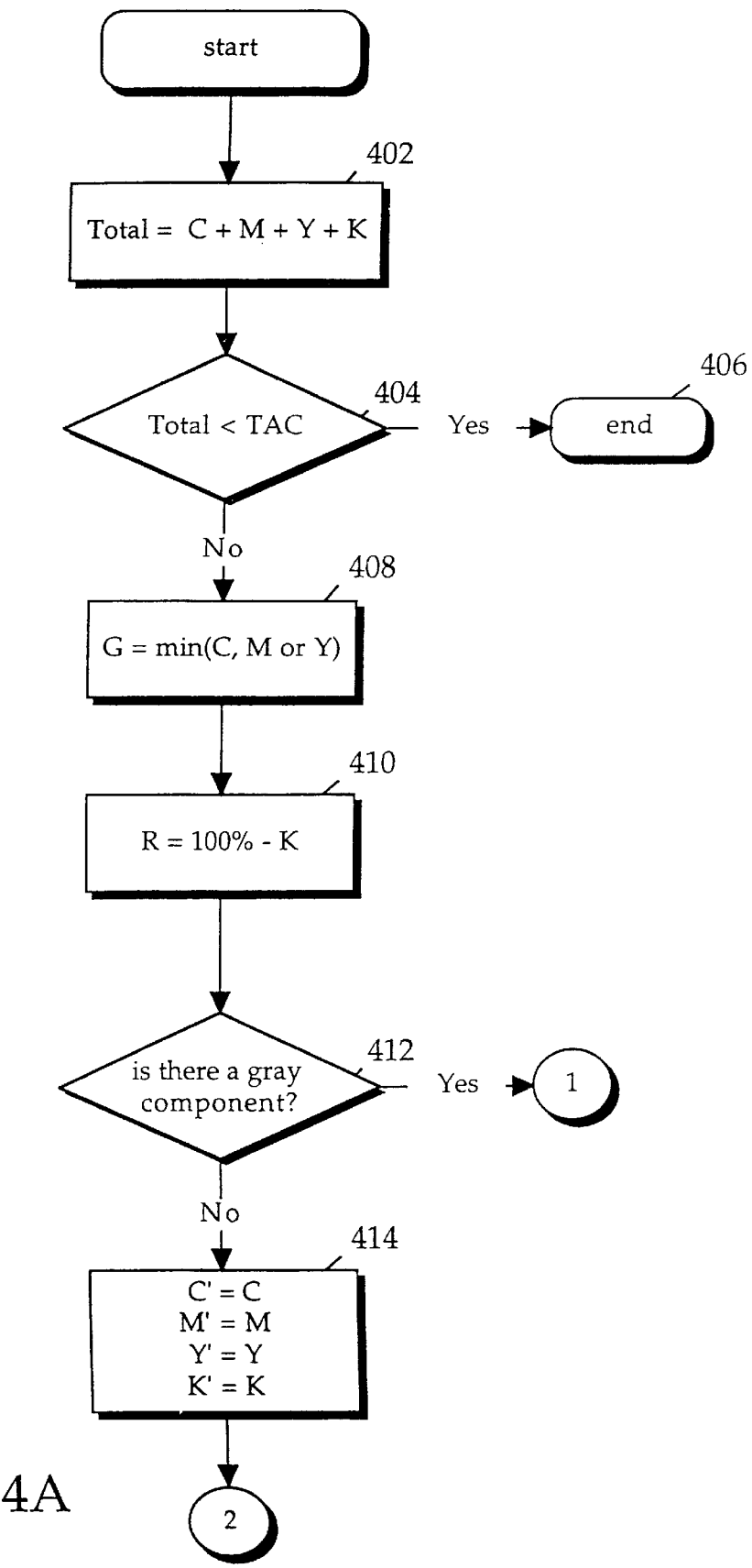
FIGS. 4A–4B illustrate one GCR/UCR process flow that can be used with embodiments of the invention.
Figure 4B:
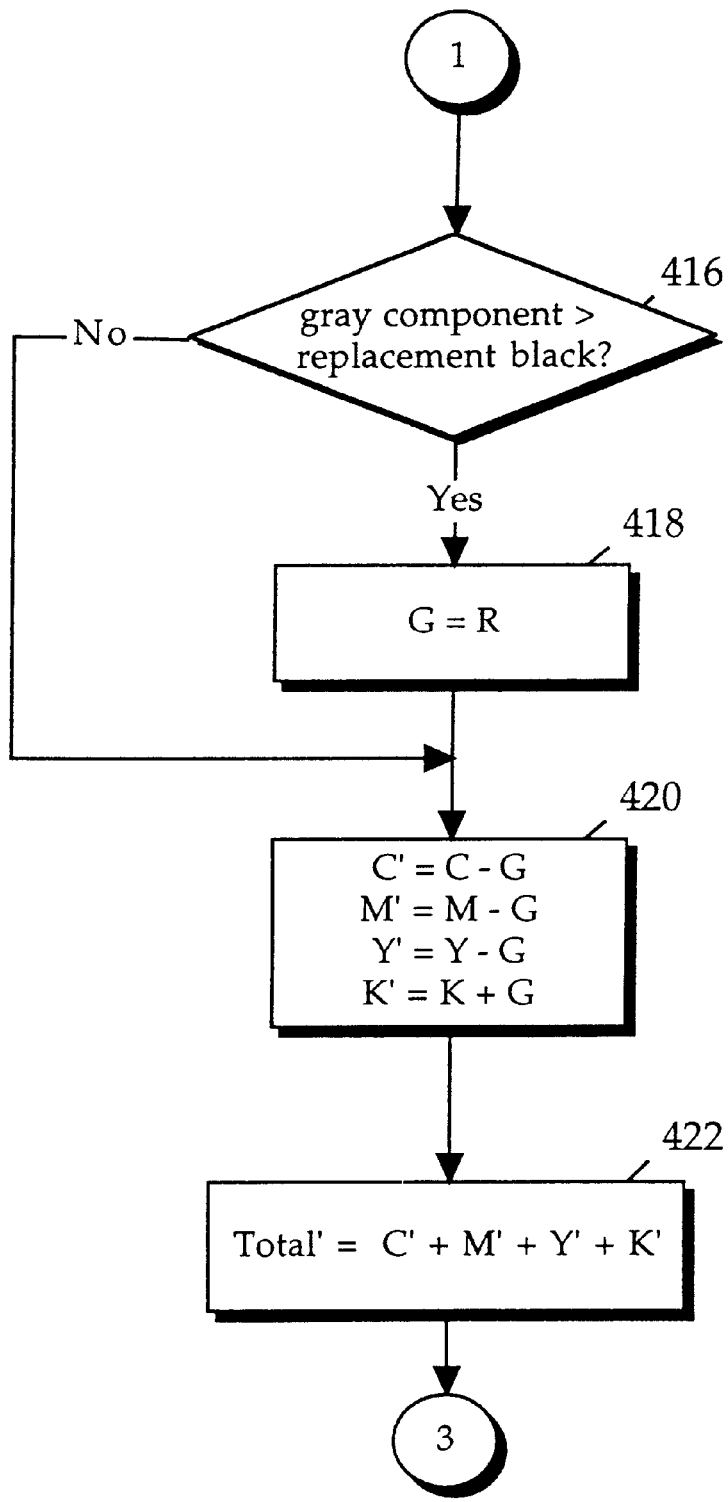

FIGS. 4A–4B illustrate one GCR/UCR process flow that can be used with embodiments of the invention. It should be apparent that any suitable prior art GCR/UCR algorithm may be used in conjunction with embodiments of the invention. The GCR/UCR process flow of FIGS. 4A–4B assume a CMYK color model, however, it is possible that embodiments of the invention can be used with other color models as well.

At step 402, a total is obtained which is the sum of the values of the C, M, Y and K color components. For example, if C, M, Y and K have respective values of 55%, 65%, 75% and 65%, the total is equal to 260%. At step 404, a determination is made whether the total determined in step 402 is less than the threshold TAC amount. If the total is less than the threshold TAC amount, the color definition is not altered. If, however, the total determined at step 402 is less than or equal to the threshold TAC amount, processing continues at step 408.

If, for example, a total of 260% is determined at step 402 and assuming a threshold TAC amount of 250%, the total exceeds the threshold TAC value and processing continues at step 408. At step 408, a gray component, G, is obtained from the smallest of the C, M and Y components. For example, in the previous example, the C color component's value of 55% is smaller than the 65% and 75% values of the M and Y components (respectively). Thus, G is equal to 55% in this example. That is, 55% of the C, M and Y components contribute to the color's gray component.

At step 410, a replaceable black value, R, is determined that identifies the amount of the black component, K, that is not already assigned to K. For example, if the K component has a value of 65% (i.e., K is at 65% of saturation), R is equal to 35% (i.e., 100% −65%).

At step 412, a determination is made whether a valid value was determined for the gray component (i.e., G>0) at step 408. If each of C, M and Y are equal to zero, there is no gray component, for example. If there is no gray component, processing continues at step 414 to generate a value for color' 306 which is comprised of C', M', Y' and K' equal to C, M, Y and K (respectively). Since it was previously determined (at step 402) that the total is greater than the threshold TAC amount, processing continues at step 512 of FIG. 5 to calculate the factor, X, that is used to modify C', M', Y' and K'.

If it is determined at step 412 of FIG. 4A that there is a valid value for G (i.e., there is a gray component), processing continues at step 416 of FIG. 4B. At step 416, a determination is made whether the gray component, G, exceeds the replaceable black, R, obtained in step 410 of FIG. 4A. If so, processing continues at step 418 to set G equal to R, and processing continues at step 420. If not, processing continues at step 420. Since G is to be added back to the black component, steps 416 and 418 ensure that the result is not greater than the allowable percentage (e.g., 100%) for the black component.

At step 420, the gray component, which is less than or equal to R, is removed from the C, M and Y color components and added back to the K component. Using the values of 55% of C, 65% of M, 75%, of Y and 65% of K in the above example, G was determined to be 55% (at step 408) and reduced to 35% (at step 418). The values of C', M', Y' and K', therefore, are 20%, 30%, 40% and 100% (respectively) as a result of step 420.

At step 422, a total' is obtained which is the sum of C', M', Y' and K'. If C', M', Y' and K' are 20%, 30%, 40% and 100% (respectively), total' is 190%. The C', M', Y' and K' values reflect a level of saturation determined by the GCR/UCR process flow whose total (i.e., total') is the GCR/UCR total. Processing continues at step 502 of FIG. 5 to determine what, if any, modifications should be made to optimize the saturation levels of the C', M' Y' and K'.

Figure 5:
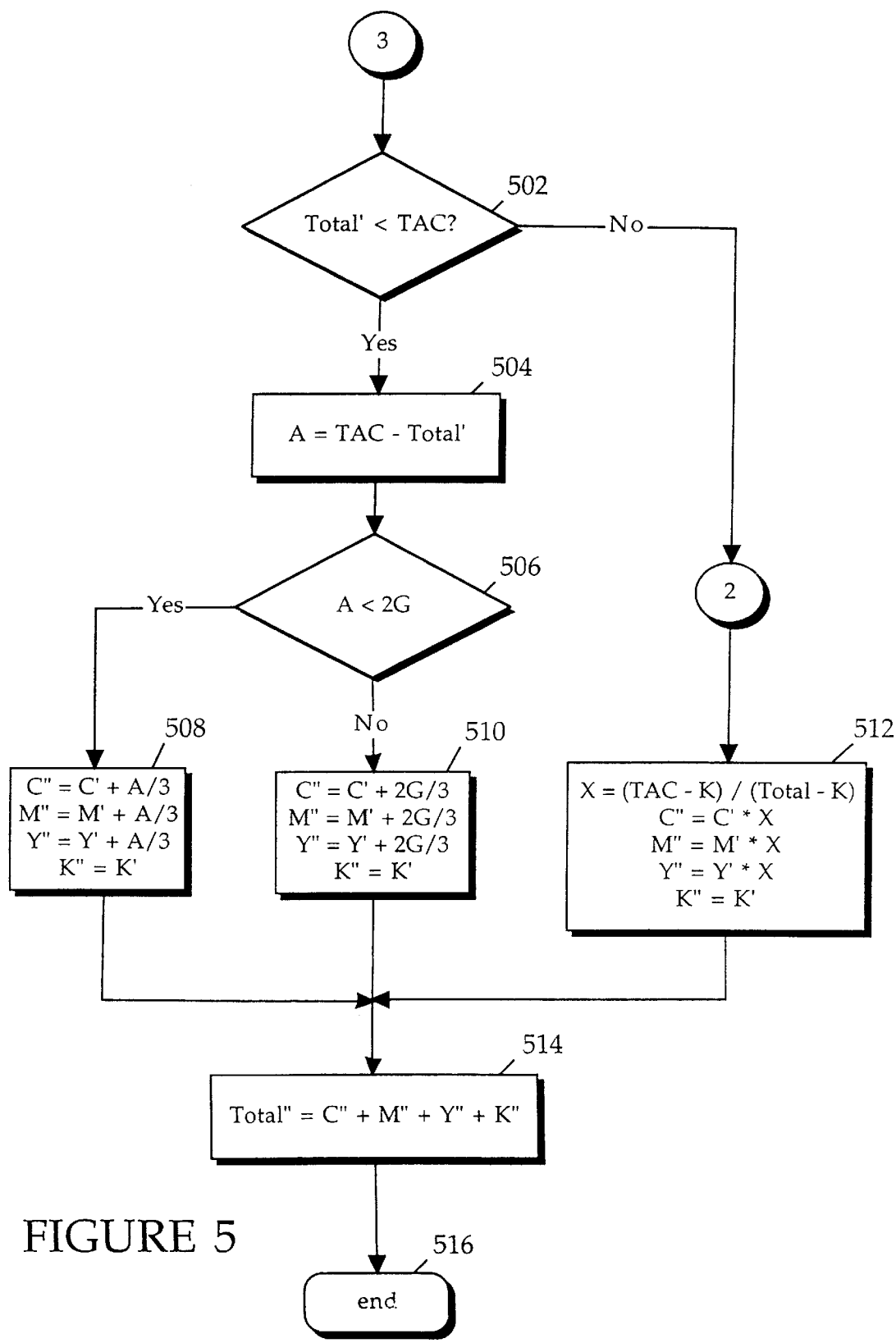
FIG. 5 provides a saturation compensation process flow according to an embodiment of the invention.

FIG. 5 provides a saturation compensation process flow according to an embodiment of the invention. At step 502, a determination is made whether total' is greater than the threshold TAC amount. If so, processing continues at step 512 to reduce total' to an amount that is equal to or less than the threshold TAC amount.

At step 512, a factor, X, is obtained that is formed from a ratio of the contribution of C, M and Y to the threshold TAC amount (i.e., TAC–K) over the contribution of C, M and Y to the total (i.e., total–K). Each of C', M' and Y' values are multiplied by X to yield C", M" and Y". K" is set to the value of K'. To illustrate, if C, M, Y and K are 20%, 90%, 90% and 90% (respectively), C', M', Y' and K' are 10%, 80%, 80%, and 100% (respectively). Total' is equal to 270% which exceeds a threshold TAC amount of 250%. Using these values, X is determined (at step 512) as follows:

$$\frac{(250\% - 90\%)}{(20\% + 90\% + 90\% + 90\%) - 90\%} = \frac{160\%}{200\%} = 0.8.$$

The value of X obtained in step 512 is used to modify C', M', and Y' to generate C", M" and Y" (respectively). Using the values for C', M', Y' and X in the previous example, C", M" and Y" are calculated as follows:

C"=10%*0.8=8%

M"=80%*0.8=64%

Y"=80%*0.8=64%

Thus, C', M' and Y' are reduced by the factor of X to yield C", M" and Y". The value of K" is set to K'. A new total, total", which is the sum of C", M", Y" and K" is determined to be 236% at step 514 which is less than the threshold TAC amount of 250%.

Step 512 is used to reduce C', M' and Y' when total' is determined to be greater than the threshold TAC amount at step 502. If it is determined at step 502 that total' is less than the threshold TAC amount, processing continues at step 504 to determine an amount of colorant to add back to C', M' and Y' to yield C", M" and Y".

At step 504, a value, A, is obtained that is the difference between the threshold TAC amount and the total' calculated in step 422 of FIG. 4B. In step 420 of FIG. 4B, G is removed from each of C, M and Y and G is added to K. Thus, 3G is removed and 1G is added back yielding a decrease in the total colorant of 2G (i.e., 3G–1G). At step 506, a determination is made whether A is less than 2G. If so, processing continues at step 508 to add A back to C', M', Y' to yield C", M", Y". If A is greater than or equal to 2G, processing continues at step 510 to add 2G back to C', M', Y' to yield C", M", Y". At steps 508 and 510, K" is set to K'. At step 514, total" is determined to be the sum of C", M", Y" and K". Processing ends at step 516.

To illustrate, when A is less than 2G, a total of A is added back to C', M' and Y'. The following table provides an example where A is less than 2G. The numbers are percentages between 0 and 100%.

| Color Components | Color | Color' | Color" |
|---|---|---|---|
| C | 45 | 0 | 25 |
| M | 90 | 45 | 70 |
| Y | 90 | 45 | 70 |
| K | 45 | 85 | 85 |
| Totals | 270 | 175 | 250 |

In this example, the threshold TAC amount is 250%. The total of C, M, Y and K is 270% which is greater than the threshold TAC amount. At step 408, G is determined to be 45% and (at step 416 of FIG. 4B) to be less than R (i.e., R=100% –45%, or 55%). At step 420, G is subtracted from C, M and Y and added to K to yield 0% of C, 45% of M', 45% of Y' and 90% of K'. Total' is determined to be 175% at step 422.

Referring to step 504 of FIG. 5, A is equal to 75% (i.e., 250% –175%). At step 506, A is determined to be less than 2G (i.e., 2G is 2*45%, or 90%). Therefore, at step 508, a total of A is added back to C', M' and Y'. That is, one-third of A is added to each of C', M' and Y' to yield C", M" and Y" (i.e., 25%, 70% and 70%). K" is set to K' (i.e., 85%). Total" is determined to be 250% at step 514. The saturation levels for C, M and Y are restored without exceeding the threshold TAC amount.

When A is greater than or equal to 2G, a total of 2G is added back to C', M' and Y'. The following table provides an example where A is greater than or equal to 2G. The numbers are percentages between 0 and 100%. The threshold TAC amount is assumed to be 250%.

| Color Components | Color | Color' | Color" |
|---|---|---|---|
| C | 15 | 0 | 10 |
| M | 80 | 65 | 75 |
| Y | 75 | 60 | 70 |
| K | 80 | 95 | 95 |
| Totals | 250 | 220 | 250 |

The total of C, M, Y and K is 250% which is equal to the threshold TAC amount. At step 408, G is determined to be 15% which is less than R (i.e., R=100% –80%, or 20%). At step 420, G is subtracted from C, M and Y and added to K to yield 0% for C', 65% for M', 60% for Y' and 95% for K'. Total' is determined to be 220% at step 422.

Referring to step 504 of FIG. 5, A is equal to 30% (i.e., 250% –220%). At step 506, A is determined to be equal to 2G (i.e., 2*15%, or 30%). Therefore, at step 508, a total of 2G is added back to C', M' and Y' to generate C", M" and Y". That is, one-third of 2G (i.e., 10%) is added to each of C', M' and Y' to yield 10% for C", 75% for M" and 60% for Y". K" is set to K' (i.e., 95%). Total" is determined to be 250% at step 514.

Thus, a method and apparatus for saturation compensation in total ink limited output has been provided.

What is claimed is:

1. A method of defining the color component values for a color in a computer system comprising the steps of:

determining a gray component of said color;

removing said gray component from said color;

adding said gray component to a black component of said color to generate a modified black component;

decreasing a non-gray component of said color such that said modified black component in combination with said decreased non-gray component does not exceed a threshold amount, if it is determined that said modified black component in combination with said non-gray component exceeds said threshold amount; and increasing said non-gray component such that said modified black component in combination with said increased non-gray component does not exceed said threshold amount, if it is determined that said modified black component in combination with said non-gray component does not exceed said threshold amount, said step of increasing said non-gray component comprising the steps of:

defining a total' as the combination of said non-gray component and said modified black component;

defining a value, "A," to be the difference between said threshold amount and the amount of said total';

increasing said non-gray component by said "A," if it is determined that said "A" is less than "2G," where "2G" is twice said gray component; and increasing said non-gray component by said "2G," if it is determined that said "A" is not less than said "2G,".

2. The method of claim 1 wherein said step of decreasing said non-gray component comprises the steps of:

defining a factor which has as its numerator the combination of said gray component and said non-gray component and has as its denominator said threshold amount minus said black component; and decreasing said non-gray component by said factor to generate said decreased non-gray component.

3. The method of claim 2 wherein said color is defined by cyan, magenta, yellow and black color components and said non-gray component is comprised of said cyan, magenta and yellow color components wherein said step of reducing further comprises the steps of:

decreasing said cyan color component by said factor;

decreasing said magenta color component by said factor; and decreasing said yellow color component by said factor.

4. The method of claim 1 wherein said color is defined by cyan, magenta, yellow and black color components and said non-gray component is comprised of said cyan, magenta and yellow color components, said step of adding said "A" to said non-gray component further comprises the steps of:

increasing said cyan component by one-third of said "A;"

increasing said magenta component by one-third of said "A;" and increasing said yellow component by one-third of said "A."

5. The method of claim 1 wherein said color is defined by cyan, magenta, yellow and black color components and said non-gray component is comprised of said cyan, magenta and yellow color components, said step of adding said "2G" to said non-gray component further comprises the steps of:

increasing said cyan component by one-third of said "2G;"

increasing said magenta component by one-third of said "2G;"

increasing said yellow component by one-third of said "2G,"

6. A saturation compensation system comprising:

a computer having a central processing system and memory;

a GCR/UCR process coupled to said computer that receives as input a color having a gray component, a non-gray component and a black component, said GCR/UCR process generating a color' comprised of said non-gray component and a modified black component, said modified black component is said black component increased by said gray component;

a saturation compensation process coupled to said GCR/USR process that examines said color' for overreductions and underreductions and corrects said overreductions and said underreductions wherein said underreductions are corrected by the following steps comprising:

defining a total' as the combination of said non-gray component and said modified black component;

defining a value, "A," to be the difference between a threshold amount and the amount of said total';

increasing said non-gray component by said "A," if it is determined that said "A" is less than "2G," where "2G" is twice said gray component; and increasing said non-gray component by said "2G," if it is determined that said "A" is not less than said "2G,"

7. The system of claim 6 wherein said color' includes an amount of said gray component when an overreduction is identified by said saturation compensation process.

8. The system of claim 6 wherein said color" includes a reduction to said non-gray component when an underreduction is identified by said saturation compensation process.

9. The saturation compensation system of claim 6 wherein said overreductions are corrected by the following steps comprising:

defining a factor which has as its numerator the combination of said gray component and said non-gray component and has as its denominator said threshold amount minus said black component; and decreasing said non-gray component by said factor to generate said decreased non-gray component.

10. An article of manufacture comprising:

a computer usable medium having computer readable program code embodied therein for defining the color component values for a color comprising:

computer readable program code configured to cause a computer to determine a gray component of said color;

computer readable program code configured to cause a computer to remove said gray component from said color;

computer readable program code configured to cause a computer to add said gray component to a black component of said color to generate a modified black component;

computer readable program code configured to cause a computer to decrease a non-gray component of said color such that said modified black component in combination with said decreased non-gray component does not exceed a threshold amount, if it is determined that said modified black component in combination with said non-gray component exceeds said threshold amount; and computer readable program code configured to cause a computer to increase said non-gray component such that said modified black component in combination with said increased non-gray component does not exceed said threshold amount, if it is determined that said modified black component in combination with said non-gray component does not exceed said threshold amount, said computer readable program code configured to cause a computer to increase said non-gray component comprising:

computer readable program code configured to cause a computer to define a total' as the combination of said non-gray component and said modified black component;

computer readable program code configured to cause a computer to define a value, "A," to be the difference between said threshold amount and said total';

computer readable program code configured to cause a computer to increase said non-gray component by said "A," if it is determined that said "A" is less than "2G," where "2G" is twice said gray component; and computer readable program code configured to cause a computer to increase said non-gray component by said "2G," if it is determined that said "A" is not less than said "2G,"

11. The article of manufacture of claim 10 wherein said computer readable program code configured to cause a computer to decrease said non-gray component comprises:

computer readable program code configured to cause a computer to define a factor which has as its numerator the combination of said gray component and said non-gray component and has as its denominator said threshold amount minus said black component; and computer readable program code configured to cause a computer to decrease said non-gray component by said factor to generate said decreased non-gray component.

12. The article of manufacture of claim 11 wherein said color is defined by cyan, magenta, yellow and black color components and said non-gray component is comprised of said cyan, magenta and yellow color components, said computer readable program code configured to cause a computer to decrease said non-gray component by said factor further comprises:

computer readable program code configured to cause a computer to decrease said cyan color component by said factor;

computer readable program code configured to cause a computer to decrease said magenta color component by said factor; and computer readable program code configured to cause a computer to decrease said yellow color component by said factor.

13. The article of manufacture of claim 11 wherein said color is defined by cyan, magenta, yellow and black color components and said non-gray component is comprised of said cyan, magenta and yellow color components, said computer readable program code configured to cause a computer to add said "A" to said non-gray component further comprises:

computer readable program code configured to cause a
computer to increase said cyan component by one-third
of said "A;"

computer readable program code configured to cause a
computer to increase said magenta component by one-third of said "A;" and computer readable program code configured to cause a
computer to increase said yellow component by one-third of said "A."

14. The article of manufacture of claim 11 wherein said color is defined by cyan, magenta, yellow and black color components and said non-gray component is comprised of said cyan, magenta and yellow color components, said computer readable program code configured to cause a computer to add said "2G" to said non-gray component further comprises:

computer readable program code configured to cause a
computer to increase said cyan component by one-third of said "2G;"

computer readable program code configured to cause a
computer to increase said magenta component by one-third of said "2G;"

computer readable program code configured to cause a
computer to increase said yellow component by one-third of said "2G,"

15. A method of defining the color component values for a color in a computer system comprising the steps of:

obtaining a threshold amount;

obtaining a non-gray color component comprising cyan, magneta, and yellow color components;

comparing said cyan, said magneta, and said yellow color components;

obtaining a smallest value from said cyan, said magneta, and said yellow color components;

obtaining a gray component by setting said gray component equal to said smallest value;

determining a replaceable black component by subtracting a black component from a totally black component;

comparing said gray component to said replaceable black component and setting said gray component equal to said replaceable black component if said gray component exceeds said replaceable black component;

removing said gray component from said cyan, said magneta, and said yellow color components to generate cyan', magneta', and yellow' color components;

adding said gray component to said black component to generate a modified black component;

generating a total' which comprises the sum of said cyan', said magneta', said yellow', and said modified black color components;

comparing said total' to said threshold amount;

increasing said non-gray component, if said total' does not exceed said threshold amount; and decreasing said non-gray component, if said total' exceeds said threshold amount, comprising:

obtaining a factor which has as its numerator said threshold amount minus said black component and its denominator the sum of said cyan, said magneta, and said yellow color components;

multiplying said cyan', said magneta', and said yellow' color components by said factor to generate cyan", magneta", and yellow" color components;

obtaining a decreased non-gray color component comprising said cyan", said magneta", said yellow", and said modified black component.

16. An article of manufacture comprising:

a computer usable medium having computer readable program code embodied therein for defining the color component values for a color in a computer system:

computer readable program code configured to cause a computer to obtain a threshold amount;

computer readable program code configured to cause a computer to obtain a non-gray color component comprising cyan, magneta, and yellow color components;

computer readable program code configured to cause a computer to compare said cyan, said magneta, and said yellow color components;

computer readable program code configured to cause a computer to obtain a smallest value from said cyan, said magneta, and said yellow color components;

computer readable program code configured to cause a computer to obtain a gray component by setting said gray component equal to said smallest value;

computer readable program code configured to cause a computer to determine a replaceable black component by subtracting a black component from a totally black component;

computer readable program code configured to cause a computer to compare said gray component to said replaceable black component and setting said gray component equal to said replaceable black component if said gray component exceeds said replaceable black component;

computer readable program code configured to cause a computer to remove said gray component from said cyan, said magneta, and said yellow color components to generate cyan', magneta', and yellow' color components;

computer readable program code configured to cause a computer to add said gray component to said black component to generate a modified black component;

computer readable program code configured to cause a computer to generate a total' which comprises the sum of said cyan', said magneta', said yellow', and said modified black color components;

computer readable program code configured to cause a computer to compare said total' to said threshold amount;

computer readable program code configured to cause a computer to increase said non-gray component, if said total' does not exceed said threshold amount; and computer readable program code configured to cause a computer to decrease said non-gray component, if said total' exceeds said threshold amount, comprising:

computer readable program code configured to cause a computer to obtain a factor which has as its numerator said threshold amount minus said black component and its denominator the sum of said cyan, said yellow, and said magneta color components;

computer readable program code configured to cause a computer to multiply said cyan', said magneta', and said yellow' color components by said factor to generate cyan", magneta", and yellow" color components;

computer readable program code configured to cause a computer to obtain a decreased non-gray color component comprising said cyan", said magneta", said yellow" color components, and said modified black component.

17. A method of defining the color component values for a color in a computer system comprising the steps of:

determining a gray component of said color;

removing said gray component from said color;

adding said gray component to a black component of said color to generate a modified black component;

decreasing a non-gray component of said color such that said modified black component in combination with said decreased non-gray component does not exceed a threshold amount, if it is determined that said modified black component in combination with said non-gray component exceeds said threshold amount, said step of decreasing said non gray component comprising, defining a factor which has as its numerator said threshold amount minus said black component and its denominator said non-gray component which comprises the sum of cyan, yellow, and magneta color components and wherein said factor is less than one; and decreasing said non-gray component by said factor to generate said decreased non-gray component; and increasing said non-gray component such that said modified black component in combination with said increased non-gray component does not exceed said threshold amount, if it is determined that said modified black component in combination with said non-gray component does not exceed said threshold amount.

* * * * *